US007877546B2

(12) United States Patent
Zohar et al.

(10) Patent No.: US 7,877,546 B2
(45) Date of Patent: Jan. 25, 2011

(54) SYSTEM, METHOD, AND CIRCUIT FOR RETRIEVING DATA IN DATA BLOCKS INTO A CACHE MEMORY FROM A MASS DATA STORAGE DEVICE BASED ON A TRIGGERING EVENT

(75) Inventors: Ofir Zohar, Alfe-Menashe (IL); Yaron Revah, Tel-Aviv (IL); Haim Helman, Ramat Gan (IL); Dror Cohen, Petach-Tikva (IL); Shemer Schwartz, Herzelia (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/914,746

(22) Filed: Aug. 9, 2004

(65) Prior Publication Data

US 2006/0031633 A1 Feb. 9, 2006

(51) Int. Cl.
*G06F 13/00* (2006.01)

(52) U.S. Cl. ....................... 711/118; 711/113; 711/137; 711/138; 714/723

(58) Field of Classification Search ................. 711/113, 711/137, 118, 138; 714/723
See application file for complete search history.

(56) References Cited

U.S. PATENT DOCUMENTS

| | | | | | |
|---|---|---|---|---|---|
| 4,468,730 | A | * | 8/1984 | Dodd et al. | 711/113 |
| 5,590,300 | A | * | 12/1996 | Lautzenheiser | 711/202 |
| 5,682,500 | A | | 10/1997 | Vishlitzky et al. | |
| 6,128,703 | A | * | 10/2000 | Bourekas et al. | 711/138 |
| 6,381,677 | B1 | * | 4/2002 | Beardsley et al. | 711/137 |
| 6,816,946 | B2 | * | 11/2004 | Magoshi | 711/137 |
| 6,922,802 | B2 | * | 7/2005 | Kim et al. | 714/723 |

* cited by examiner

*Primary Examiner*—Yong Choe
(74) *Attorney, Agent, or Firm*—Griffiths & Seaton PLLC

(57) ABSTRACT

Upon receiving a request for one or a set of data blocks associated with a given data segment, a disk cache controller may retrieve into cache the some part of the entire data segment from a disk. Each data segment on a disk may include a fixed number of data blocks, and all data segments may include the same number of data blocks. Data segments may be dynamically defined and their locations and sizes may vary from segment to segment. Data segments may be defined when data is written to the disk, or may be defined at a later point. A table associated with a cache controller may store information as to the physical location or address on a disk of the starting point and/or size of each data segment.

19 Claims, 7 Drawing Sheets

SYSTEM, METHOD, AND CIRCUIT FOR RETRIEVING DATA IN DATA BLOCKS INTO A CACHE MEMORY FROM A MASS DATA STORAGE DEVICE BASED ON A TRIGGERING EVENT

FIELD OF THE INVENTION

The present invention relates generally to the field of digital memory storage. More specifically, the present invention relates to a system, method and circuit for retrieving data into a cache memory from a mass data storage device and/or system.

BACKGROUND OF THE INVENTION

A data storage system is typically able to service "data write" or "data read" requests issued by a host computer. A host may be connected to the storage system's external controller, or interfaces (IF), through various channels that transfer both data and control information (i.e. control signals). Physical non-volatile media in which data may be permanently or semi-permanently stored includes arrays of disk devices, magnetic or optical, which are relatively less expensive than semiconductor based volatile memory (e.g. Random Access Memory) but are relatively much slower in being accessed.

A cache memory is a high-speed buffer located between an IF and the disk device(s), which is meant to reduce the overall latency of Input/Output activity between the storage system and a host accessing data on the storage system. Whenever a host requests data stored in a memory system, the request may be served with significantly lower latency if the requested data is already found in cache, since this data must not be brought from the disks. As of the year 2004, speeds of IO transactions involving disk activity are typically on the order of 5-10 milliseconds, whereas IO speeds involving cache (e.g. RAM memory) access are on the order of several nanoseconds.

The relatively high latency associated with disk activity derives from the mechanical nature of the disk devices. In order to retrieve requested data from a disk based device, a disk controller must first cause a disk reading arm to physically move to a track containing the requested data. Once the head of the arm has been placed at the beginning of a track containing the data, the time required to read the accessed data on the relevant track is relatively very short, on the order of several microseconds.

One criterion or parameter which is often used to measure the efficiency of a cache memory system or implementation is a criterion referred to as a hit ratio. A hit ratio of a specific implementation is the percentage of "data read" requests issued by the host that are already found in cache and that consequently did not require time intensive retrieval from disk operations. An ideal cache system would be one reaching a 100% hit ratio. One way known in the art to improve performance by means of enhancing the hit ratio, includes implementing intelligent algorithms that attempt to guess in advance which portions of data stored on a disk device will soon be requested by a host. Once it has been estimated/guessed that some specific data will soon be requested, in anticipation of the request, the algorithm(s) "pre-fetch" the data into the cache, prior to actually receiving a request for the data.

Prefetch algorithms known in the art commonly fall into one of two categories. The first category or group includes algorithms which are based on the identification of sequential streams of read requests. If the storage system, or the cache controller therein, is able to identify that the host is issuing such sequential streams it may then assume that this kind of activity will be maintained for some time, and accordingly, it will guess which additional portions of data will be requested by the host in the near future. The anticipated portions are thus sent to the cache in advance. U.S. Pat. No. 5,682,500 to Vishlitzky, et al. describes such a prefetch method.

A second group of prefetch algorithms includes algorithms which are based on the identification of "hot zones" in the storage system. That is, a statistical analysis of activity in the system may indicate that a certain area, defined in advance as a potential "hot zone", is being intensely addressed by a host, and consequently, a mechanism may be triggered to bring into cache all the data contained in that hot zone. The underlying assumption is that such data portions tend to be addressed in their totality, or in their majority, whenever they are addressed over a certain threshold of focused activity.

Unfortunately, the current approaches to prefetch algorithms require the use of considerable computational resources in order to (1) monitor activity on an ongoing basis, (2) decide on which data to prefetch, and (3) to implement the desired prefetch policy in a coordinated manner across the system. The amount of computational overhead involved in such activity may be considerable and costly, both in time, energy and hardware.

Beyond attaining high "hit ratios", it is desirable for a cache to have additional properties, such as: scalability, the ability to maintain redundant caches and/or disks, and relatively few overhead management transactions associated with data processing.

There is a need for a method of implementing prefetch operations requiring a relatively small amount of computational and resource overhead, and for a system and circuit for implementing same.

There is a further need for a method of implementing prefetch operations requiring a relatively small amount of overhead and producing a relatively high cache hit ratio, and for system and circuit for implementing same.

SUMMARY OF THE INVENTION

According to some embodiments of the present invention, upon receiving a request for one or a set of data blocks associated with a given data segment, a disk cache controller may retrieve into cache (i.e. prefetch) some part or the entire data segment from a disk. Each data segments on a disk may include a fixed number of data blocks, and all data segments may include the same number of data blocks.

According to some embodiments of the present invention, data segments may be dynamically defined and their locations and sizes may vary from segment to segment. Data segments may be predefined, defined when data is written to the disk, or may be defined at some later point. A table associated with a cache controller may store information relating to the physical location or address on a disk of the starting point and/or size of each data segment.

According to some embodiments of the present invention, some or all of a data segment may be retrieved into cache from a disk after a threshold number of data blocks associated with the data segment are requested, either within a single request or within some number of consecutive requests.

According to some embodiments of the present invention, a requested data block may be deemed associated with a data segment if the requested data block is within the data segment. According to some embodiments of the present invention, a cache controller may compare the physical location or address of a requested data block with data within a data table indicating the physical location or address of various data segments. By comparing the physical location or address of a requested data block with data within a data table indicating the physical location or address of various data segments, a controller may determine with which data segment a requested data block may be associated, and may retrieve into cache some or all of the data segment.

According to a further embodiment of the present invention, some or all of a data segment may be retrieved into cache from a disk after one or a set of blocks having either a specific; (1) location, (2) sequence, (3) pattern or (4) order within the data segment have been requested, thus trigger the retrieval of the data into cache.

According to some embodiments of the present invention, the cache controller may include a logic circuit and/or unit to determine which one or combination of data block requests is a sufficient trigger for the retrieval of some or all of a data segment. According to some embodiments of the present invention, the logic circuit and/or unit may establish one or more triggers for one group of data segments, while establishing another one or more triggers for another group of data segments. The triggers for each group of segments may be completely different from one another or may share some common triggers. Triggers for one or more data segments may be dynamically adjusted during operation to suite operational conditions.

The present invention will be more fully understood from the following detailed description, taken together with the drawings, a brief description of which is given below.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
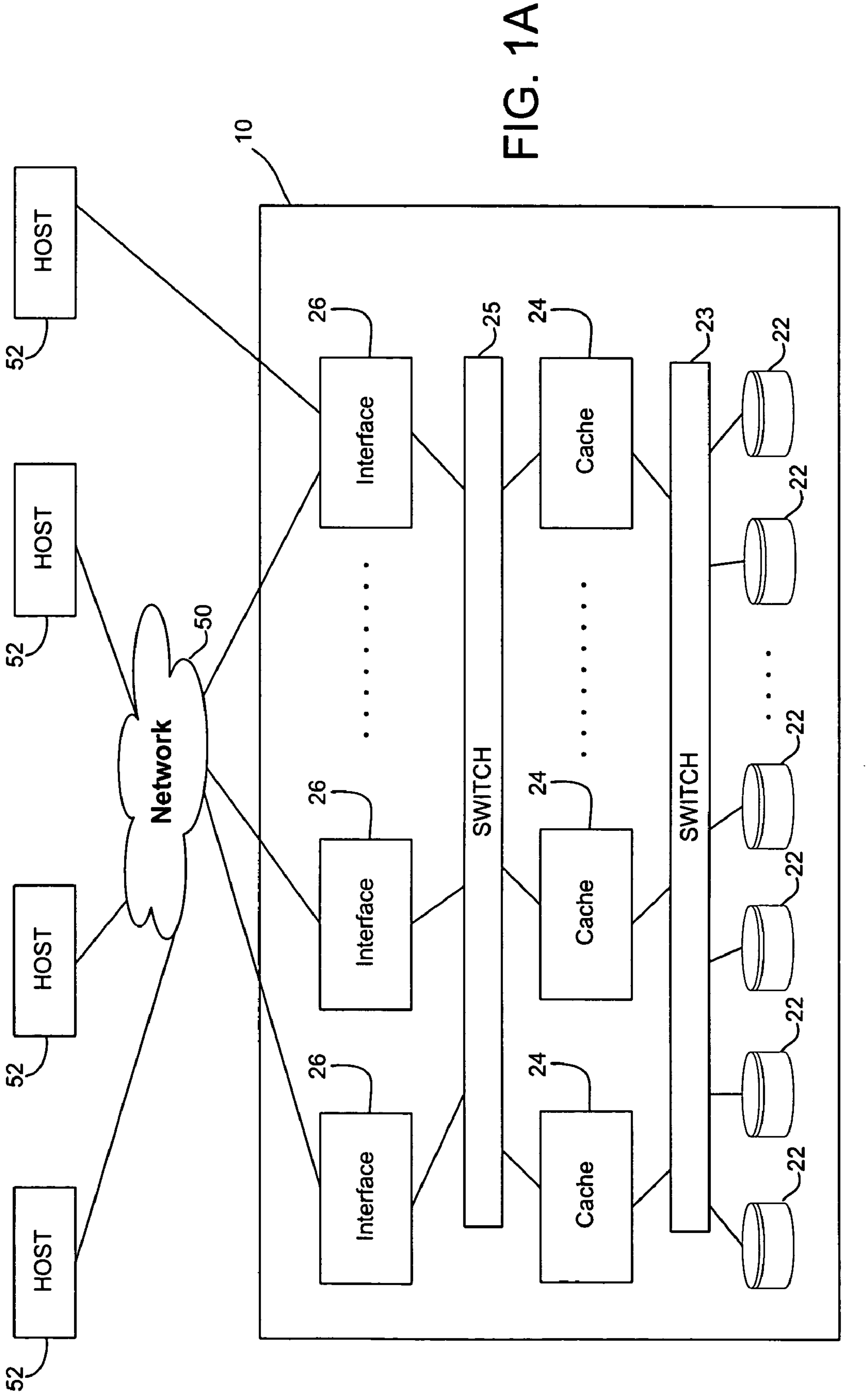
FIG. 1A is a schematic block diagram of one possible storage system configuration which may be operated in accordance with a data prefetching method, system and apparatus according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

According to some embodiments of the present invention, upon receiving a request for one or a set of data blocks associated with a given data segment, a disk cache controller may retrieve into cache (i.e. prefetch) some part or the entire data segment from a disk. Each data segment on a disk may include a fixed number of data blocks, and all data segments may include the same number of data blocks.

According to some embodiments of the present invention, data segments may be dynamically defined and their locations and sizes may vary from segment to segment. Data segments may be predefined, defined when data is written to the disk, or may be defined at some later point. A table associated with a cache controller may store information relating to the physical location or address on a disk of the starting point and/or size of each data segment.

According to some embodiments of the present invention, some or all of a data segment may be retrieved into cache from a disk after a threshold number of data blocks associated with the data segment are requested, either within a single request or within some number of consecutive requests.

According to some embodiments of the present invention, a requested data block may be deemed associated with a data segment if the requested data block is within the data segment. According to some embodiments of the present invention, a cache controller may compare the physical location or address of a requested data block with data within a data table indicating the physical location or address of various data segments. By comparing the physical location or address of a requested data block with data within a data table indicating the physical location or address of various data segments, a controller may determine with which data segment a requested data block may be associated, and may retrieve into cache some or all of the data segment.

According to a further embodiment of the present invention, some or all of a data segment may be retrieved into cache from a disk after one or a set of blocks having either a specific; (1) location, (2) sequence, (3) pattern or (4)order within the data segment have been requested, thus trigger the retrieval of the data into cache.

According to some embodiments of the present invention, the cache controller may include a logic circuit and/or unit to determine which one or combination of data block requests is a sufficient trigger for the retrieval of some or all of a data segment. According to some embodiments of the present invention, the logic circuit and/or unit may establish one or more triggers for one group of data segments, while establishing another one or more triggers for another group of data segments. The triggers for each group of segments may be completely different from one another or may share some common triggers. Triggers for one or more data segments may be dynamically adjusted during operation to suit operational conditions.

Reference is now made to FIG. 1A, which is a schematic block diagram of one possible storage system configuration which may be operated in accordance with a prefetching method, system and apparatus according to some embodiments of the present invention. The system 10 may service IO requests generated by one or more host computers 52. The storage system 10 may include one or more cache devices or components 24 and one or more disk devices 22. As part of some embodiments of the present invention, the cache devices 24 may be adapted to perform prefetch operations to pre-store data from one or more disk devices 22.

As part of some embodiments of the present invention, the host computers 52 may be connected to the storage system 10 through ports or interfaces 26, either directly or via a distributed data network 50. The storage system 10 may include one or more cache memories 24 and disk devices 22. The data may be permanently stored in the disk devices 22 (e.g. burned optical disk) or may be semi-permanently stored in the disk device 22 (e.g. magnetic disk or semi-conductor based non-volatile mass memory arrays). As part of some embodiments of the present invention, the storage system 10 may further include interface (IF) components 26 and switches 23 and 25, e.g. fabric switches. The IF components 26 may be adapted to communicate with the cache components 24 over a first fabric switch 25, and the cache components 24 may be similarly adapted to communicate with the disk devices 22 over a second fabric switch 23.

It should be noted that the storage system 10 shown in FIG. 1A and described hereinabove is exemplary in nature, and that other possible storage systems having different architectures may be used as part of some embodiments of the present invention.

Figure 1B:
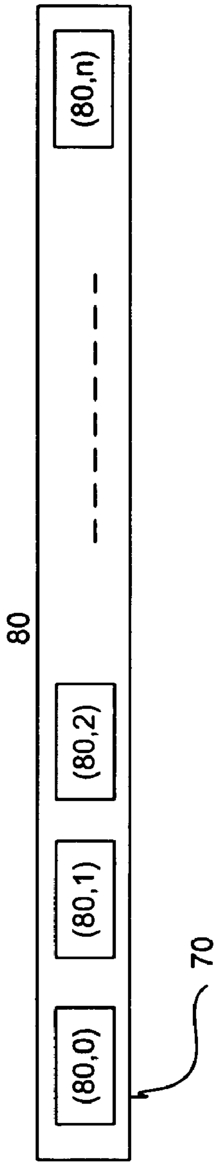
FIG. 1B is a block diagram illustrating one possible storage segment configuration which may be utilized by a disk device to store blocks of data, as part of some embodiments of the present invention.

FIG. 1B, to which reference is currently made, is a block diagram illustrating one possible storage configuration utilized by a disk device to store blocks of data in a data segment, as part of some embodiments of the present invention. The disk device may store one or more related data blocks consecutively or in physical proximity with one another, for example on a single track, wherein the media of the track upon which data bits are stored may be either magnetic, semi-conductor or optical in nature. FIG. 1B shows a portion of a track of a disk device containing successive data blocks organized into a data segment, where for purposes of this example, the segment has been designated segment number 80, and data blocks contained therein are designated by segment number and block number [e.g. block(80, 1), block(80, 2) . . . block (80, N), where N is the total number of blocks in a given data segment].

Figure 1C:
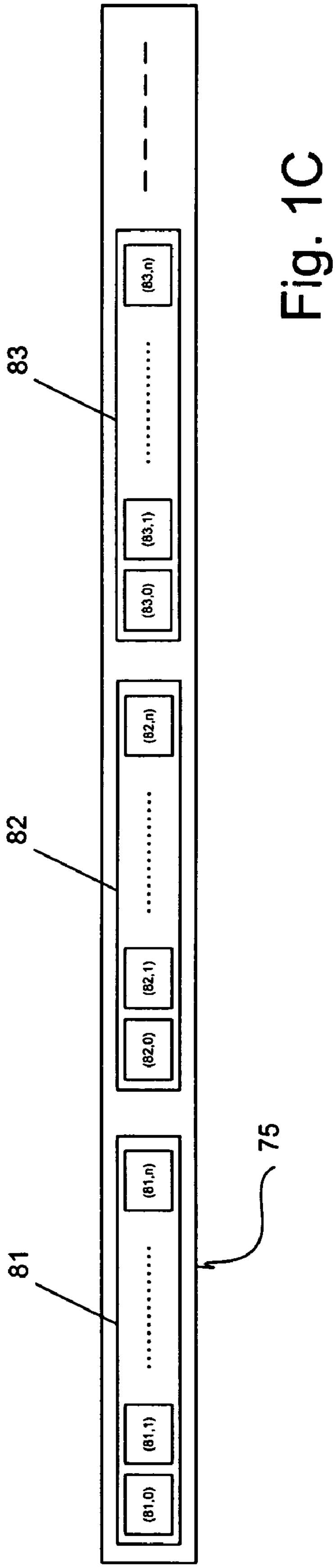
FIG. 1C is a block diagram illustrating a possible storage configuration of multiple data segments which may be utilized by a disk device to store blocks of data, as part of some embodiments of the present invention.

Reference is made to FIG. 1C which is a block diagram illustrating a possible storage configuration of multiple data segments which may be utilized by a disk device operated according to some aspects of the present invention, to store blocks of data. As described above, successive data blocks may be clustered to form one or more data segments. As part of some embodiments of the present invention, in accordance with some disk device implementation, each segment may be a set of successive blocks. All the data blocks of a segment may reside on a single track 75 of the disk, or may be in close physical proximity with one another. Further more groups of segments may be further grouped into a single track. In the 1C, Track 75 may include a plurality of segments 81, 82, 83, 84, . . . , whereby each of segments 81, 82, 83, 84, . . . may include one or more successive blocks. For example segment 82 of track 75 may include the following data blocks (82,0) (82,1) . . . (82,*i*) . . . (82,*m*) . . . (82,*n*).

As part of some embodiments of the present invention, as illustrated in FIGS. 1B and 1C, data to be stored on a disk device or any other mass data storage device may be partitioned into data blocks, where successive blocks may be stored physically adjacent or in proximity with one another on the device's storage media, and related data blocks may be logically grouped into data segments. For example, as shown in FIGS. 1B and 1C, Block (80,0) may be the first block in the set of two or more successive blocks, while block (80,1) may be the second block, immediately following block (80,0), in the set of successive blocks, and block (80,*n*) may be the nth block in a set of N successive blocks. Similarly, in case successive blocks form a data segment on a track, then block (80,0) may be the first block in the segment on the track and block (80,*n*) may be the nth block in the segment on the track. Although all the segments shown in FIG. 1C appear to contain the same number of data, blocks, according to some embodiments of the present invention, the number of blocks per segment may vary from segment to segment, and between groups of segments.

Figure 2B:
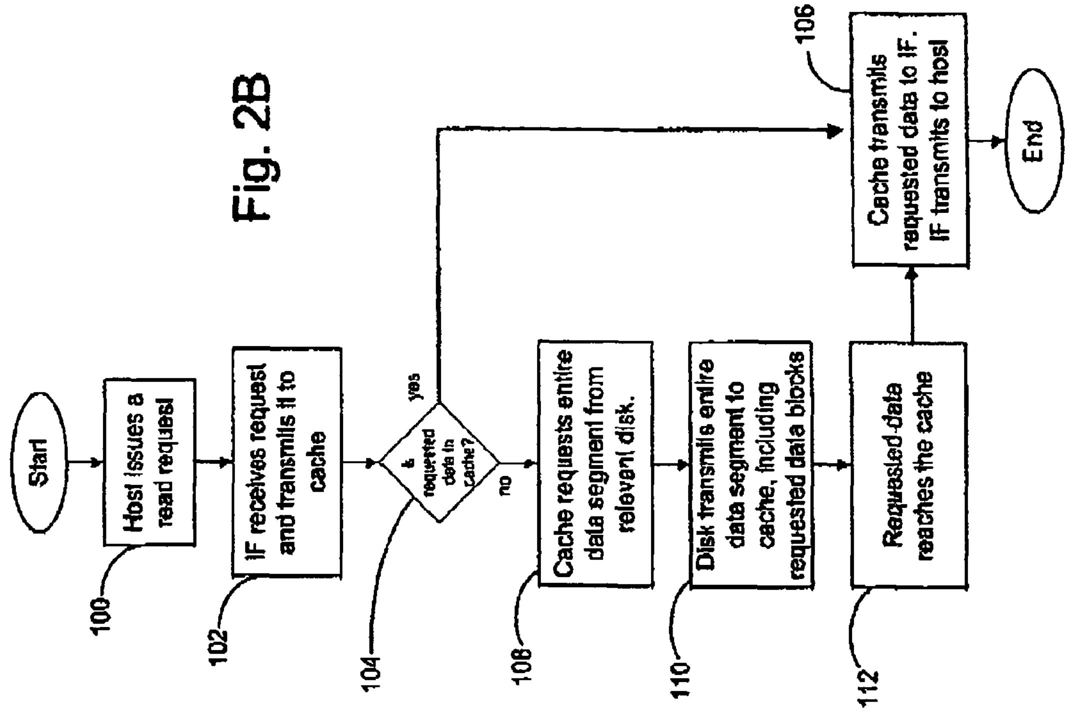
FIG. 2B is a flow chart illustration of the steps of a method of performing prefetch operations in a data storage systems, in accordance with some embodiments of the present invention.
Figure 2A:
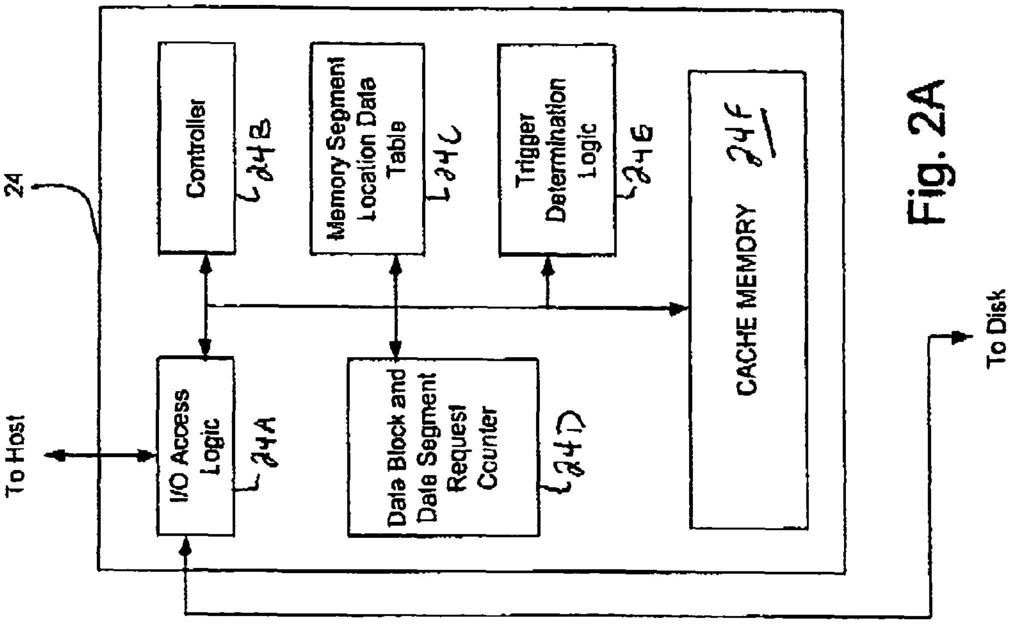
FIG. 2A is a block diagram illustrating functional blocks of an exemplary cache adapted to operate according to some embodiments of the present invention.

Turning now to FIG. 2A, there is shown a block diagram illustrating functional blocks of an exemplary disk cache adapted to operate according to some embodiments of the present invention. The cache may include I/O Access Logic 24A through which the cache 24 may receive requests for data from a host computer and/or an application running on a host computer. The I/O Access Logic 24A may also receive data indicating Read and write operations being performed by a host to an associated disk 22, and based on the received data controller 24B may determine the size and location (e.g. physical address) of data segments on the disk 22. As part of some embodiments of the present invention, each segment may be comprised of a fixed number of data blocks, such that each segment is equal in length to any other segment. For example, each segment may be uniformly comprised of a fixed number (e.g. 1028) of data blocks. However, it should be noted that the present invention is not limited in this respect. Rather, as part of some embodiments of the present invention, the number of data blocks associated with each segment may not be fixed and may vary from segment to segment, and between groups of data segments.

According to some embodiment of the present invention, segment size may vary from segment to segment, or between groups of segments. The number of data blocks associated with a given data segment may be selected, for example by the controller 24B, in accordance with certain parameters intended to optimize prefetching of some or all the data stored in the given data segment. These parameters may be predetermined or may be dynamically selected or updated while data is written to the segment or may be adjusted or update at some point after the data has been written to the disk. For example, the controller 24B may recognize, or otherwise receive an indication that all of the data being written to a drive during one or a series of write operations is associated with a single file used by an application. The controller 24B may thus define logical partitions (i.e. data segments) for the area on the disk to which the data associated with a single file was written, where the defined segments may contain only data blocks associated with data from the file. The segments may be equally sized and/or the last segment may be smaller than the rest. The controller 24B may store the location or address and/or the size of each defined segment into a data table 24C.

As part of some embodiments of the present invention, each segment defined such that it may include data blocks which are physically adjacent or in physical proximity to one another. Furthermore, related segments may also be defined such that the segments are either adjacent or in physical proximity with on another on a data storage media. However, the present invention is not limited in this respect. Rather, as part of some embodiments of the present invention, some disk devices may be otherwise configured and the data blocks may be otherwise segmented in such disk devices.

According to some embodiments of the present invention, segments may be redefined during read operations. For example, if over some period of time or during a series of read operations, the cache controller 24B receives one or more signals from the data block and data segment request counter 24D that there is trend in requesting small numbers of data blocks from physically distant locations (e.g. not in the same segment may on the same track), it may be inefficient to prefetch into cache memory 24F along with a request data block very many of its neighboring blocks. Under these conditions, the controller 24B may redefine the segments to be smaller. Conversely, if the controller 24B receives an indication that there is a trend of large groups of neighboring data blocks being regularly requested, the controller 24B may redefine data segments to include a larger number of data blocks. According to some simple embodiments of the present invention, data segments may have predefined sizes and locations or addresses.

Turning now to FIG. 2B, there is shown a flow chart illustration of a method of performing prefetch operations in data storage systems, in accordance with some embodiments of the present invention. Initially, host 52 may issue a read request (block 100). Interface 26 may receive the request and may transmit it to cache 24 (block 102). Cache controller 24, receiving the request through I/O logic 24A, may check to determine whether the data requested is already found in cache memory 24F (block 104). In case the requested data is found in cache 24, cache 24 may transmit the requested. data through I/O logic 24A and to host 52 via interface 26 (block 106). In case at least a portion of the requested data was not found in cache memory 24F, cache controller 24B checks the table 24C to see where the requested data resides on a storage media and may generate a request for the data from one of the disks 22, namely that disk where the requested data may be found (block 108).

According to some embodiments of the present invention, in case it is determined that at least a portion of the requested data is not available in cache 24, cache controller 24B may request the retrieval from disk 22 the data block within which the requested data may be found and multiple successive data blocks adjacent to or in proximity with the requested block, for example —the entire data segment within which the data block containing the request data may be found. Looking at FIG. 1B, as an example, in case block (80,*i*) is part of the data requested, cache controller 24B may request from disks 22 the entire segment 80 which block (80,*i*) is part of (block 108). In response, the disk may transmit the entire segment 80 to the cache, including block (80,*i*) (block 110), and cache 24 may receive requested block (80,*i*) together with the rest of the data blocks comprising segment 80. The requested data may then be transmitted to interface 26, which in turn may transmit the requested data to the host which generated the request (block 106).

It will be noticed that in accordance with some embodiments of the present invention, while serving the specific data request sent by host 52, additional successive data blocks that were not requested may have been brought into cache memory 24F. In case these blocks will be requested in the future by the host, they may already be available in cache 24, thereby potentially improving the overall hit ratio in the system. According to some embodiment of the present invention, even if a requested data block is located within cache memory 24F, the cache controller 24B may determine to retrieve from disk 22 (i.e. prefetch) some or all of the data segment to which the requested data block is associated. As mentioned above, the controller 24B may determine to which data segment a data block is associated looking up the table 24C, which table may also indicate the physical address (i.e. location on the storage media) and size of the associated data segment.

In accordance with some embodiments of the present invention, in case at least a portion of requested data is not stored in cache 24, the cache may request from the disk devices 22 to retrieve successive blocks associated with at least a portion of the data requested data, and which was not found in cache 24. For example in case requested data from data block (80,2) is not found in cache 24, storage system may retrieve all of data block (80,2) and blocks associated with block (80,2), where the term associated generally means in close physical proximity and more specifically may mean part of the same data segment. In one exemplary embodiment of the present invention, the cache 24 may request from the disk devices 22 an entire track or segment 80 associated with the at least a portion of the data requested by host (e.g. data block (80,2)). Thus, upon receiving an indication that at least a portion of the requested data is not found in cache 24, the system 10 may be adapted to retrieve successive data blocks associated with at least a portion of the requested data block.

In accordance with some embodiments of the present invention, in some cases when at least a portion of data requested by a host is not found in cache, successive data blocks stored on a disk device 22 may be fetched. The successive data blocks to be fetched may be associated with at least a portion of the requested data block. In accordance with further embodiments of the present invention, the successive blocks to be prefetched may include successive blocks which are physically adjacent or in close physical proximity to one on the storage media. In accordance with yet further embodiments of the present invention, the successive blocks to be prefetched may include a complete segment.

According to some embodiments of the present invention, the controller 24B may not automatically retrieve or prefetch data blocks from a segment associated with a requested data block. The trigger for prefetching some or all of a segment may require that several blocks from a given segment are requested, or that a specific sequence of blocks is requested before the segment is retrieved into cache. Trigger determination logic 24E may determine what is or are the most efficient triggers for a given segment at a given time. For example, based on signals from counter 24D, the trigger determination logic 24E may determine that there are two categories of data segments, those that are being accessed/requested almost in their entirety, and those that are being accessed/requested to only a small extent. In order not to retrieve those segments whose data is being requested to only a small extent, the logic 24E may set the trigger for retrieving a segment as some number of blocks greater than the maximum number of requested blocks for those segments which are being accessed to a small extent. The prefetching of such successive blocks, as well as some exemplary "triggers" which may under certain conditions cause the cache 24 to retrieve such successive blocks from disk devices 22 will be discussed in greater detail hereinbelow.

It should be clear to one of ordinary skill in the art that all the functionally and functional blocks described above, and to be described in the following discussion, may be implemented as part of a disk controller or even as part of an interface unit or switch. It should be also be noted that the present invention is not limited to any one particular data block or data block sequence which when requested by host may trigger the storage system to fetch successive blocks which may be associated with at least a portion of the requested data block or data block sequence. Below is a description of some exemplary data blocks or data block sequences which may be used to trigger the prefetching of successive blocks associated with at least a portion of the requested data, in accordance with some embodiments of the present invention.

Figure 3A:
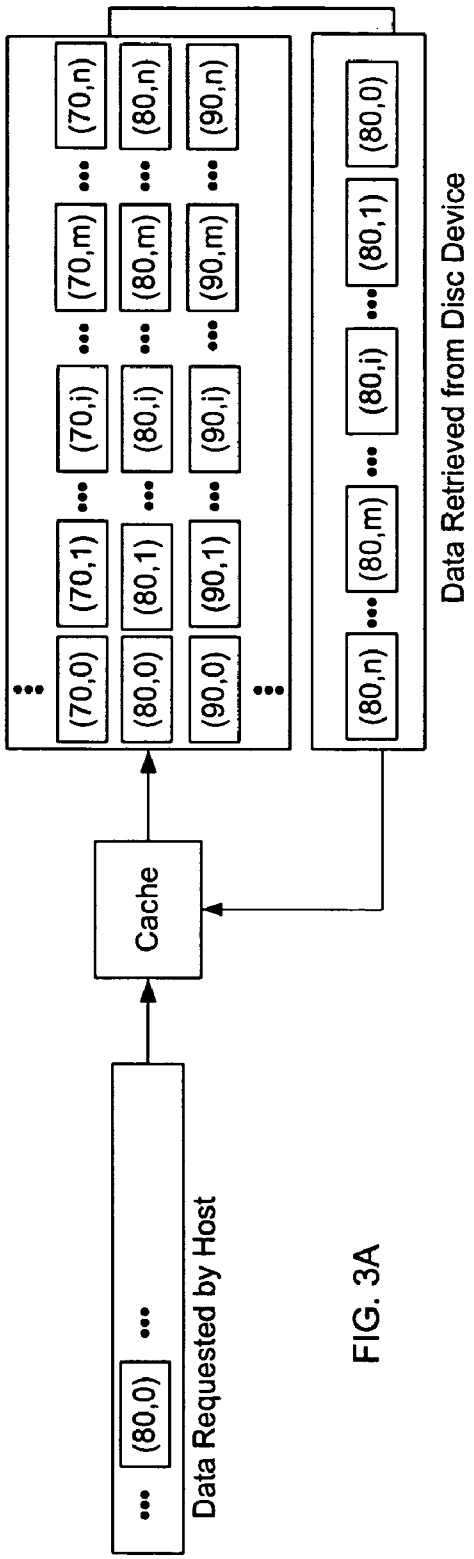
FIG. 3A is a block diagram illustration of one implementation of a trigger which may be adapted to cause successive blocks to be retrieved from a disk device, in accordance with some embodiments of the present invention.

Reference is now made to FIG. 3A which is a block diagram illustration of one implementation of a trigger which may be adapted to cause successive blocks to be retrieved from disk device, in accordance with some embodiments of the present invention. In the embodiment shown, when a data block (80,*i*) is requested by host 52 and is not found in cache 24, the system 10 may be triggered, to fetch successive data blocks 80 associated with at least a portion of the requested data from disk device 22. In one exemplary embodiment when a data block (80,*i*) is requested by host 52 and is not found in cache a controller embedded in cache 24 (not shown) may be triggered to fetch successive data blocks 80 associated with at least a portion of the requested data from disk device 22.

In accordance with one embodiment of the present invention, the successive blocks to be prefetched may be associated with the data that is the trigger for the prefetching. For example, with reference to the embodiment shown in FIG. 3A prefetched blocks (80,0)-(80,*n*) may be associated with the trigger for the prefetching, which in this case is (80,*i*). In accordance with a further embodiment of the present invention, the successive blocks to be prefetched may include at least a portion of the segment comprising at least a portion of the requested data. In a further embodiment of the present invention, the successive blocks to be prefetched may include the entire segment comprising the trigger for the prefetching. For example, with reference to FIG. 3A, prefetched blocks (80,0)-(80,*n*) may form a complete segment 80 which may be associated with the trigger for prefetching (80,*i*). This exemplary implementation may be dubbed for convenience purposes "Touch any, read all".

Figure 3B:
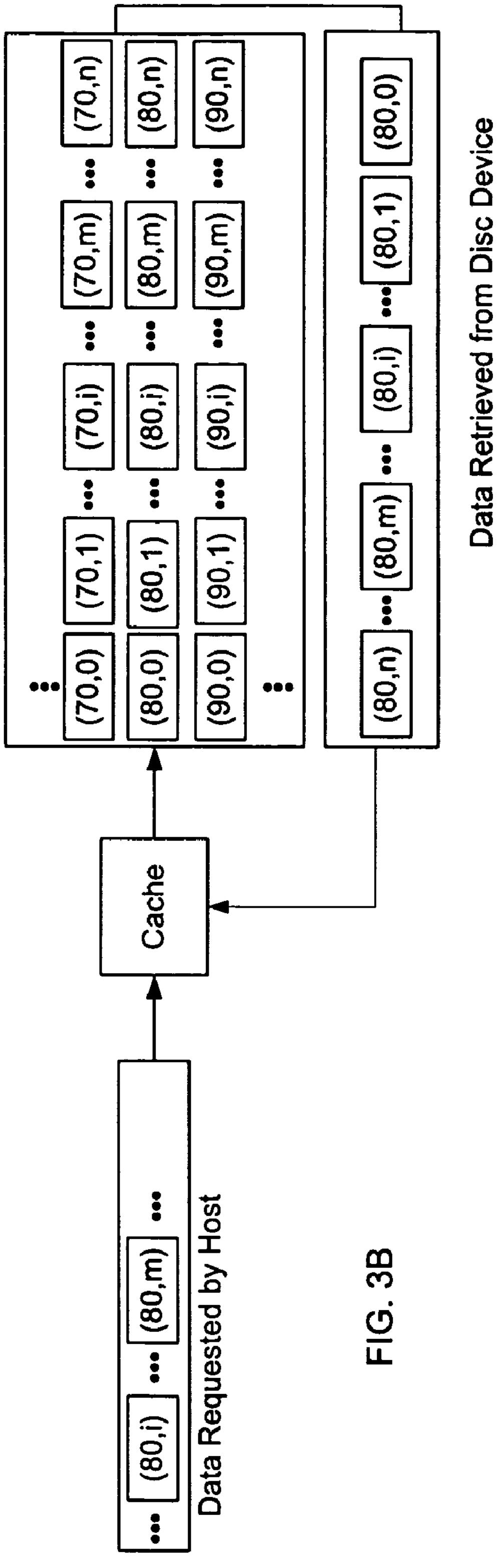
FIG. 3B is a block diagram illustration of another implementation of a trigger which may be adapted to cause successive blocks to be retrieved from a disk device, in accordance with some embodiments of the present invention.

Reference is now made to FIG. 3B which is a block diagram illustration of another implementation of a trigger which may be adapted to cause successive blocks to be retrieved from disk device, in accordance with some embodiments of the present invention. In the embodiment shown, any "x" data blocks ((80,*i*) . . . (80,*m*), for example) requested by host 52 which are not found in cache 24, may trigger the system 10 to fetch successive blocks 80 associated with at least a portion of the requested data from disk device 22.

In one embodiment of the present invention, the "x" data blocks ((80,*i*) . . . (80,*m*), for example) requested by host 52 which may trigger the system 10 to perform the prefetch operations may be associated with a specific portion or portions of the disk device, for a example a specific set of successive blocks, such as, for example, a track or a segment or any other set of successive blocks. In a further embodiment of the present invention the requested data block which may trigger the prefetch operation and the prefetched successive blocks may both be associated with a specific portion, such as a track or a segment, for example, of the disk device.

This exemplary implementation may be dubbed for convenience purposes "Touch any x blocks, read all".

Figure 3C:
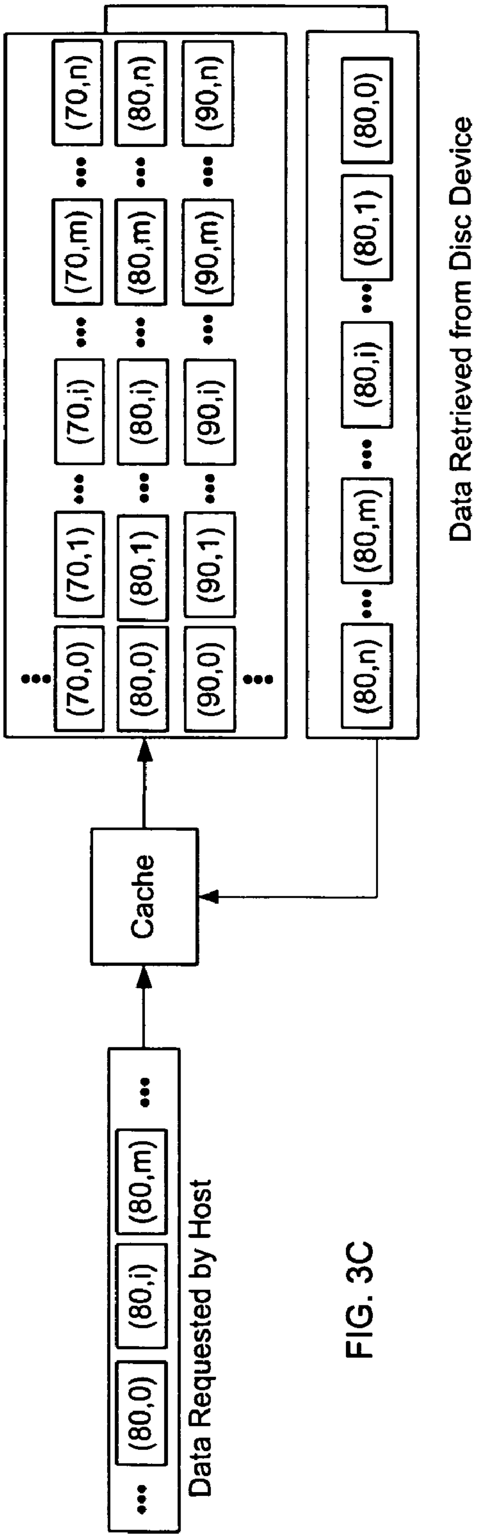
FIG. 3C is a block diagram illustration of another implementation of a trigger which may be adapted to cause successive blocks to be retrieved from a disk device, in accordance with some embodiments of the present invention.

Reference is now made to FIG. 3C which is a block diagram illustration of another implementation of a trigger which may be adapted to cause successive blocks to be retrieved from disk device, in accordance with some embodiments of the present invention. In the embodiment shown, when a specific pattern of data blocks ((80,0), (80,*i*) and (80,*m*), for example) is requested by host 52 and is not (entirely) found in cache 24, the system 10 may be triggered to fetch successive blocks 80 associated with at least a portion of the requested data from disk device 22. It should be noted, that in accordance with the present invention, the pattern may not necessarily be defined once and for all, rather the pattern may also be varied periodically.

This exemplary implementation may be dubbed for convenience purposes "Touch a pattern, read all".

Figure 3D:
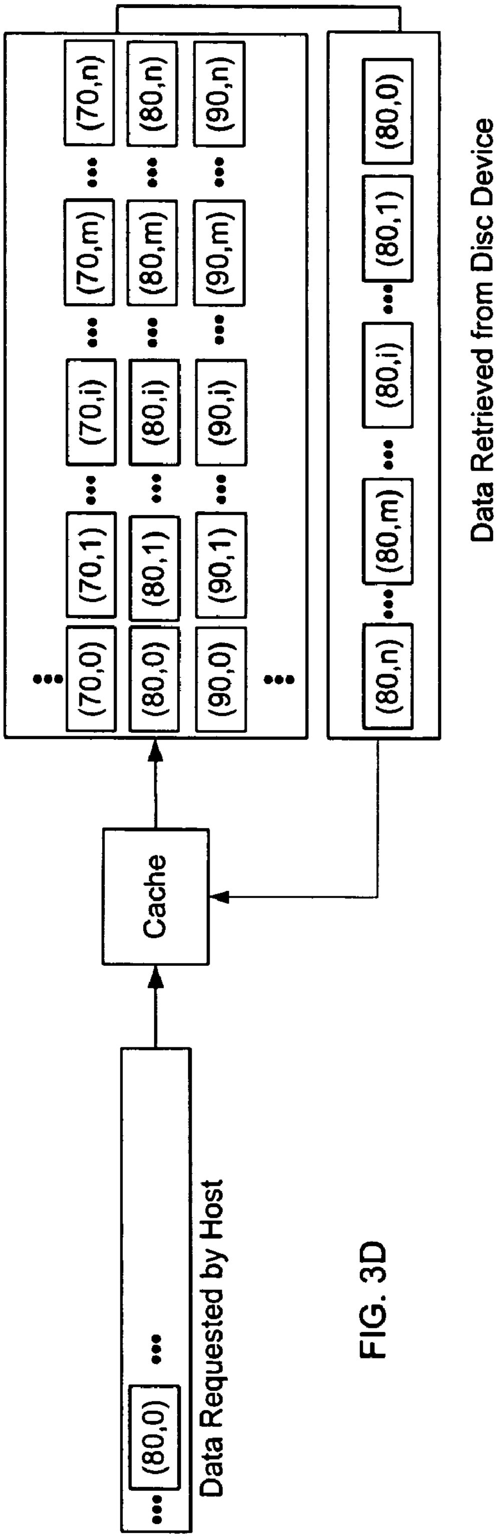
FIG. 3D is a block diagram illustration of yet another implementation of a trigger which may be adapted to cause successive blocks to be retrieved from a disk device, in accordance with some embodiments of the present invention.

Reference is now made to FIG. 3D which is a block diagram illustration of yet another implementation of a trigger which may be adapted to cause successive blocks to be retrieved from disk device, in accordance with some embodiments of the present invention. In the embodiment shown, a first data block of a set of successive blocks ((80,0) for example) which may be requested by host 52 and which may not be found in cache 24, may trigger the system 10 to fetch successive blocks 80 associated with at least a portion of the requested data from disk device 22.

In accordance with one embodiment of the present invention, the prefetched successive blocks may be at least a portion of a segment in which the trigger data block (80,0) is the first block.

This exemplary implementation may be dubbed for convenience purposes "Touch first block, read all".

Figure 3E:
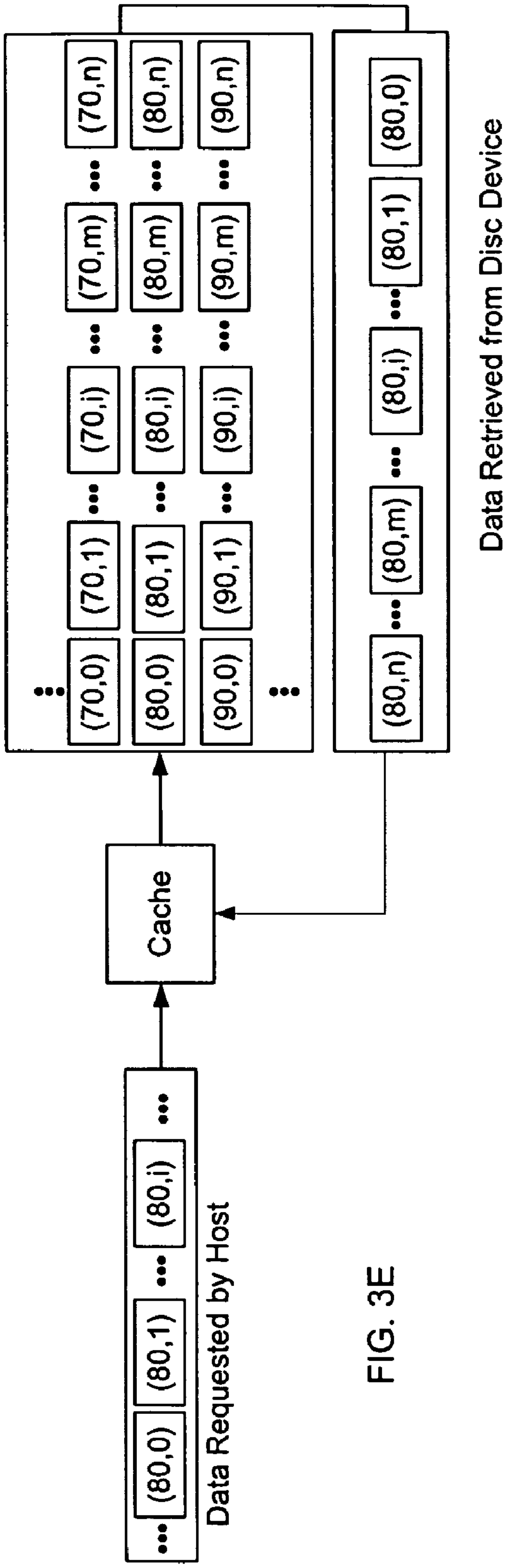
FIG. 3E is a block diagram illustration of yet another implementation of a trigger which may be adapted to cause two or more successive blocks to be retrieved from a disk device, in accordance with some embodiments of the present invention.

Reference is now made to FIG. 3E which is a block diagram illustration of yet another implementation of a trigger which may be adapted to cause successive data blocks to be retrieved from disk device, in accordance with some embodiments of the present invention. In the embodiment shown, the first "x" data blocks of a segment ((80,0) . . . (80,*i*) for example) which may be requested by host 52 and which may not (all) be found in cache 24, may trigger the system 10 to fetch successive data blocks 80 from disk device 22.

In accordance with one embodiment of the present invention, the prefetched successive blocks may be at least a portion of a segment in which the trigger data blocks (80,0) . . . (80,*i*) are the x first blocks.

This exemplary implementation may be dubbed for convenience purposes "Touch first x blocks, read all".

Figure 3F:
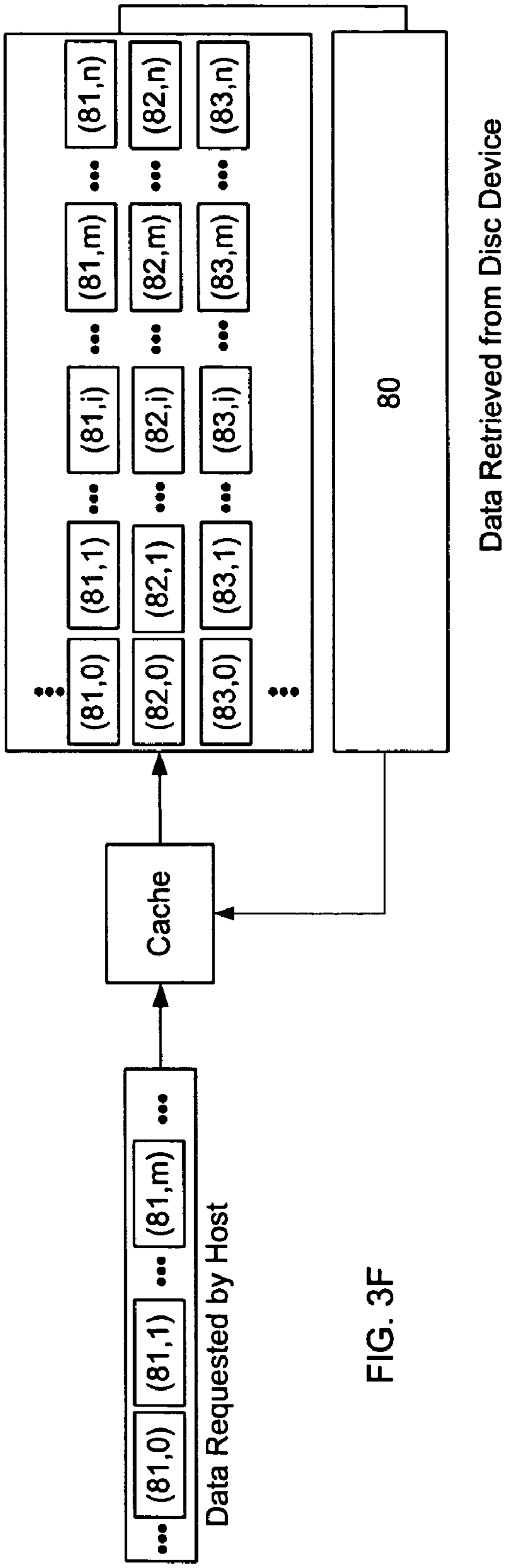
FIG. 3F is a block diagram illustration of yet another implementation of a trigger which may be adapted to cause successive blocks to be retrieved from a disk device, in accordance with some embodiments of the present invention.

Reference is now made to FIG. 3F, which is a block diagram illustration of yet another implementation of a trigger which may be adapted to cause successive block to be retrieved from disk device, in accordance with some embodiments of the present invention. In the embodiment shown, when the first m data blocks of a specific track of a segment ((81,0) . . . (81,*m*) for example) are requested by host 52 and are not (all) found in cache 24, the system 10 may be triggered to fetch the entire segment 80 from disk device 22. According to some embodiments of the present invention, in other cases, for example when, the number of the data blocks that are associated with that track or any other set of successive blocks is less then m, the storage system may not fetch any additional data beyond the data requested. In other embodiments of the present invention the system may prefetch only the track, or any other set of successive data blocks, associated with at least a portion of the requested data, rather then the entire segment.

It should be noted that in accordance with the present invention additional triggers may be devised and used in order to cause successive block or an entire track or an entire segment to be retrieved from disk device. Furthermore, those of ordinary skill in the art may appreciate that the above discussions of the various trigger implementations are not exhaustive in nature, and that rather, additional modified triggers may be readily devised. For example, the trigger described in FIG. 3F may be modified such that cache may be configured to determine if the data requested comprises any m blocks in track 81, rather than the first m blocks. Alternatively and by way of example, in an alternative embodiment of the present invention, the number m may vary periodically. The number m may vary, for example, in accordance with performance variations performance which may be measured from time to time, such as may be indicated by general load measurement in the system which in turn may be deduced from performance statistics measured in the system. In an alternative embodiment of the present invention, the number m of blocks necessary for triggering a prefetch operation may vary periodically according to statistical measurements of the performance of the system. In yet another alternative embodiment, the number of tracks in each or some segments may vary periodically in accordance with statistical measurements of the performance of the system. These alternatives are presented here merely by way of example and are included in some embodiments of the present invention.

Each of the implementations shown in FIGS. 3A-F and discussed hereinabove may be used in different systems and in different configurations thereof. Thus, by way of example, the implementations shown in FIGS. 3D, 3E and 3F may produce the best results for sequential IO activity in a system. Indeed, in case the trigger described in FIG. 3D is implemented in a storage system which is receiving a sequential data request from host 52, once the cache receives the request for block (80,0) it may fetch the entire segment 80. All the blocks in segment 80 will already be found in cache, possibly before host 52 will actually request these blocks. The system's hit ratio may thus be substantially improved.

The implementation of the trigger described with reference to FIG. 3E may represent a substantially more moderate, which may require that more than one block is present in the request from host in order to prefetch the successive data blocks. The implementation of the trigger described with reference to FIG. 3F may be considered substantially more aggressive in comparison. This trigger may initiate a more far-reaching prefetch activity based on a substantially smaller amount of information. However, the trigger of FIG. 3F may be also be considered substantially cautious since an entire segment may be prefetched only in a very specific case, which may be highly improbable in case of non-sequential activity.

Implementations described in connection with FIGS. 3A through 3C may produce more significant results in situations where "hot zones" are expected to appear in the system. Their basic underlying assumption is that, whenever a certain amount of blocks of a given zone are read, not necessarily in an ordered sequence, then the entire zone, will be eventually read, and it is thus convenient to have that zone in its entirety in cache as soon as possible.

It should further be noticed that any of the embodiments of the present invention described above are not mutually exclusive. Rather some embodiments of the present invention may be simultaneously implemented in some storage systems and may operate side by side. Alternatively, some embodiments of the present invention may be simultaneously implemented but may be activated as may be dictated by the changing conditions of I/O load in the system or any other relevant parameters or considerations.

Figure 4:
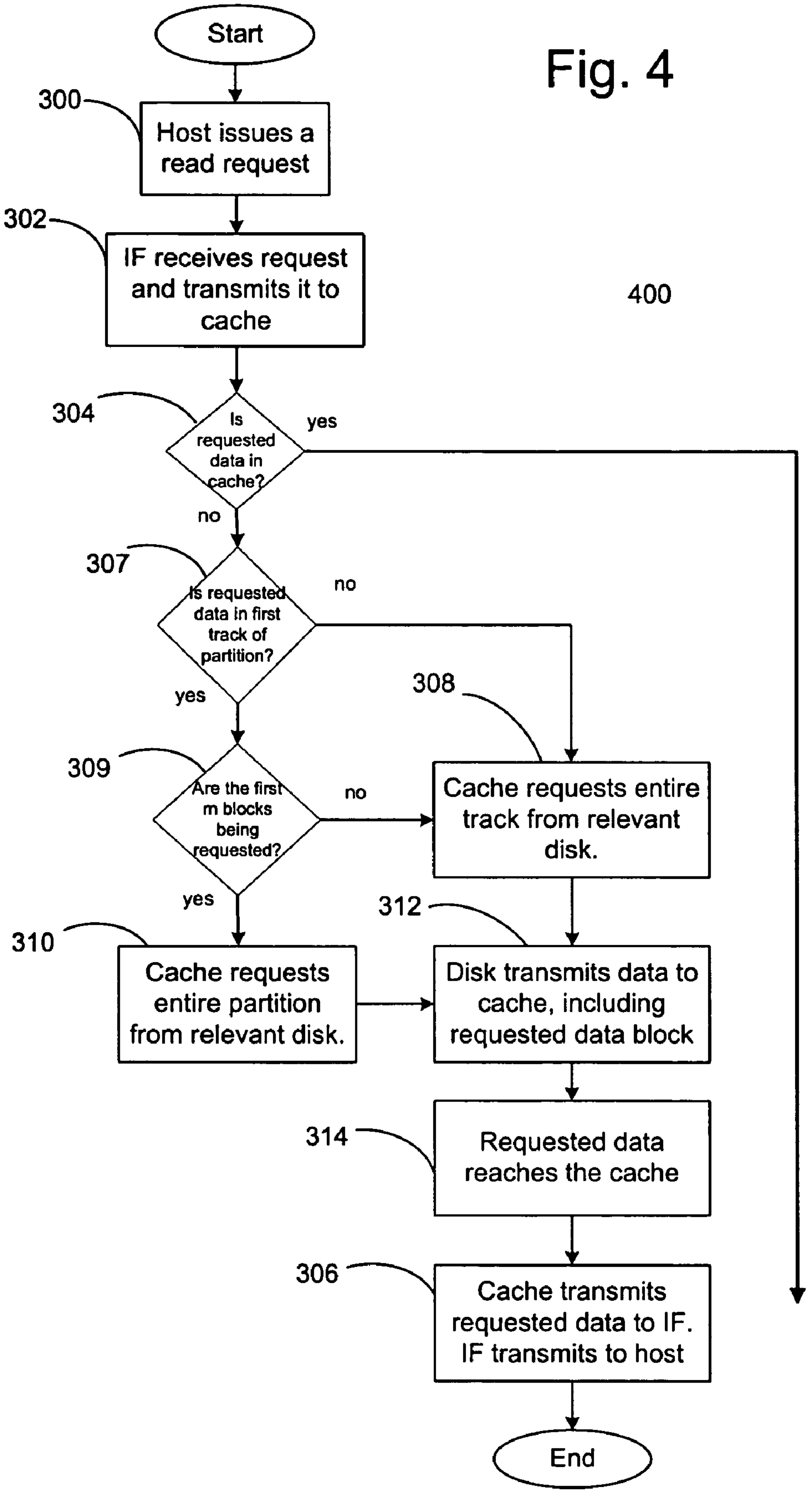
FIG. 4 is a flow chart illustration of a method of performing prefetch operations in a data storage system, in accordance with some embodiments of the present invention.

Reference is now made to FIG. 4, which is a flow chart illustration of a method of performing prefetch operations in data storage systems, in accordance with some embodiments of the present invention. Initially, host 52 may issue a read request (block 300). Interface 26 may receive the request and may transmit the request to cache 24 (block 302). Cache 24 may check to determine whether the requested data is in cache (block 304). In case the requested data is found in cache, cache 24 may transmit the requested data to host 52 via interface 26 (block 306). In case the data requested was not found in cache 24, cache 24 may determine whether one or more blocks in the requested data are associated with a specific track, for example track 81 (block 307). If none of the blocks in the requested data belong to track 81, then cache 24 may request the data from one of the disks 22, namely that disk where the requested data is found (step 308). In this case, cache 24 may not request only the specific blocks that were part of the request. Rather, cache 24 may fetch from disks 22 successive data blocks, e.g. the entire track with which the requested block(s) of the data is associated (that track being different from 81). If, however, a block in the data requested is associated with track 81, cache 24 may find determine whether the data requested comprises the first m blocks of track 81, m being a predefined number (block 309). If the blocks of data requested and which are associated with track 81 do not comprise the first m blocks of track 81, then the process may continue as described with reference to block 308, with N having the value 81. If the blocks of data requested and belonging to track 81 comprise the first m blocks of track 81, cache 24 may request the data from one of the disks 22, namely that disk where the requested data is found (block 310). Cache 24, may not request only the specific blocks that were part of the request. Rather, cache 24 may fetch the entire segment 85 to which the requested blocks are associated, from disks 22. Finally disks 22 may transmit to the cache 24 the requested data (track or segment), including the requested blocks (block 312). In step 314, the requested blocks may be found in cache 24, together with other blocks comprising segment 85 (block 314). Cache 24 may transmit the data requested by host 52 to interface 26, which in turn may transmit it to the host. The data request may have thus been served.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. A method of retrieving a data segment into a cache from a storage media, the data segment being stored in the storage media in a plurality of data blocks, said method comprising:

designating a first sequential data block of the data segment as a trigger for the retrieval of all of the data segment into the cache;

changing the designation of the trigger during operation of a system including the storage media and the cache; and retrieving all of the data segment from the media into the cache upon receiving a request for the trigger, wherein said designating comprises selecting said first sequential data block as the trigger for the retrieval of said data segment into said cache memory in accordance with predefined criteria.

2. The method according to claim 1, further comprising monitoring data block requests associated with the data segment and adapting said designating in accordance with said monitoring.

3. The method according to claim 1, wherein said designating comprises designating a plurality of blocks sequentially located at the beginning of said data segment as a further trigger for the retrieval of the data segment into the cache.

4. The method according to claim 1, wherein said designating comprises designating a predefined plurality of blocks spread across the data segment as the trigger for the retrieval of the data segment into the cache.

5. The method according to claim 1, wherein said designating comprises designating two or more triggers for the retrieval of the data segment into the cache, and wherein said retrieving comprises retrieving the data segment from the media into the cache upon receiving a request for at least one of the trigger block or blocks.

6. The method according to claim 1, wherein said designating comprises designating two or more triggers for the retrieval of the data segment into the cache, and wherein said retrieving comprises retrieving the data segment from the media into the cache upon receiving within some number of consecutive requests at least a predefined number of triggers.

7. The method according to claim 1, wherein the data segment is retrieved into the cache upon receiving the request for the trigger is adjusted dynamically during operation of the system.

8. The method according to claim 1, wherein the changing of the designation of the trigger is performed dynamically during operation of the system.

9. A disk cache circuit associable with a data storage system, the data storage system adapted to store data segments on a media in a plurality of data blocks, said disk cache comprising:

a cache memory; and a cache controller coupled to the cache memory, the cache controller adapted to;

designate a first sequential data block as a trigger for the retrieval of a data segment into said cache memory dynamically during operation of a disk cache circuit, and retrieve all of the data segment from the media into said cache memory upon receiving a request for the trigger;

wherein the designation of the first sequential data block is changed during operation of the disk cache circuit, and wherein said controller is adapted to select said first sequential data block as the trigger for the retrieval of said data segment into said cache memory in accordance with predefined criteria when designating said first sequential data block as the trigger.

10. The disk cache circuit according to claim 9, further comprising one or more logic circuits to monitor data block requests associated with the data segment.

11. The disk cache circuit according to claim 9, wherein said controller is adapted to change which one of said first sequential data block is said trigger for the retrieval of the data segment into said cache memory when selecting the first sequential data block as the trigger.

12. The disk cache circuit according to claim 9, further comprising a table associated with said cache controller, said table being adapted to store information relating to the physical location or address of each data segment on a data storage system and/or to the starting point and/or the size of each data segment of the data storage system.

13. The disk cache circuit according to claim 9, wherein said cache controller is adapted to designate a plurality of triggers, each trigger being associated with a set of sequential data blocks, when selecting the first sequential data block as the trigger, and wherein said controller is further adapted to retrieve all of a data segment from the media into said cache memory upon receiving within some number of consecutive requests at least one of said plurality of triggers.

14. The disk cache circuit according to claim 9, wherein said cache controller is adapted to designate a plurality of triggers, each trigger being associated with a set of sequential data blocks, when selecting the first sequential data block as the trigger, and wherein said controller is further adapted to retrieve all of a data segment from the media into said cache memory upon receiving within some number of consecutive requests at least a predefined number of said plurality of triggers.

15. The disk cache circuit according to claim 9, wherein said cache controller is adapted to designate any data block in the data segment as a further trigger for the retrieval of all of the data segment into said cache memory when selecting the first sequential data block as the trigger.

16. The disk cache circuit according to claim 9, wherein said cache controller is adapted to designate a plurality of blocks sequentially located at the beginning of the data segment as the trigger for the retrieval of the data segment into said cache memory when selecting the first sequential data block as the trigger.

17. The disk cache circuit according to claim 9, wherein said cache controller is adapted to designate a predefined plurality of sequential data blocks spread across the data segment as the trigger for the retrieval of the data segment into said cache memory when selecting the first sequential data block as the trigger.

18. The disk cache circuit according to claim 9, wherein:

the cache controller is further adapted to designate a second block of the data segment as a further trigger for the retrieval of a portion of the data segment into the cache; and the cache controller is further adapted to retrieve the portion of the data segment from the storage media into the cache upon receiving a request for the further trigger.

19. The disk cache circuit according to claim 9, wherein the data segment retrieved into said cache memory upon receiving the request for the trigger is adjusted dynamically during operation of the system.

* * * * *